United States Patent [19]

Kaleta

[11] 4,147,826

[45] Apr. 3, 1979

[54] SNAKE SKIN MOUNTING

[76] Inventor: Donald J. Kaleta, 5020 Bellemeadow, Mentor, Ohio 44060

[21] Appl. No.: 891,753

[22] Filed: Mar. 30, 1978

Related U.S. Application Data

[63] Continuation of Ser. No. 763,859, Jan. 31, 1977, abandoned.

[51] Int. Cl.² .......................... C14B 17/00; C14C 15/00; B32B 9/02

[52] U.S. Cl. .......................... 428/151; 8/150.5; 69/21.5; 156/250; 428/473; 428/543; 428/904

[58] Field of Search .......................... 69/21, 21.5; 8/137, 8/137.5, 150.5; 427/149; 428/151, 473, 543, 904, 914; 156/250, 254, 260, 270, 271, 198

[56] References Cited

U.S. PATENT DOCUMENTS

| | | | |
|---|---|---|---|
| 1,235,299 | 7/1917 | Ellsworth | 69/21 |
| 1,300,535 | 4/1919 | Whist | 428/473 X |
| 1,503,946 | 8/1924 | Gusdorf | 428/473 |
| 2,210,581 | 8/1937 | Goerk | 428/473 X |
| 2,590,194 | 3/1952 | Maeser | 8/150.5 |
| 3,030,235 | 4/1962 | Goudie et al. | 8/137.5 X |
| 3,334,003 | 8/1967 | Edwards | 428/914 |
| 3,342,657 | 9/1967 | Dyer | 156/260 X |
| 3,558,765 | 1/1971 | Bruner et al. | 8/137.5 X |
| 4,055,059 | 10/1977 | Dokoupil | 69/21 X |

*Primary Examiner*—Harold Ansher

*Attorney, Agent, or Firm*—Teare, Teare & Sammon

[57] ABSTRACT

A method of mounting a shed snake skin. The shed snake skin is saturated in water to render it limber and free of folds with at least some foreign particles being removed. The skin is subjected to flowing water to remove the remaining foreign particles. A pool of water is placed on a plastic substrate. The saturated skin is placed on the pool of water, cut longitudinally, flattened on the pool of water and caused to dry to form a unitary structure, with the shed skin adhered to the substrate.

12 Claims, No Drawings

SNAKE SKIN MOUNTING

This is a continuation of application Ser. No. 763,859 filed Jan. 31, 1977 now abandoned.

BACKGROUND OF THE INVENTION

This invention relates to the mounting of shed snake skins for scientific or decorative purposes.

All snakes periodically shed a portion of their skins in a process referred to as desquamation. The frequency of desquamation of skin shedding, is about 6 times annually for a young snake, and between 1 to 3 sheds per year for a mature adult. However, bodily damage or excess heat can increase the number of sheddings per year by prematurely triggering the desquamation process.

During desquamation, the entire exterior part of the snake is cast off, usually in one single piece. This includes the scales, the skin between them, the transparent eye scale, the lips, and even the chambers of the pit vipers are all cast as one continuous skin.

The skin portion which is cast off is called the stratum corneum, and is only the most exterior skin portion or stratum. The entire skin of a living snake is divided into two major layers with the outermost layer divided into two "strata," with only the most exterior stratum being shed. The first layer, the inside layer, is disposed closer to the body and known as the dermis. The dermis is a relatively thick layer. Surrounding the dermis is the relatively thinner layer known as the epidermis which actually is not a single layer, but rather is composed of two sublayers known as strata. The innermost stratum of the epidermis is disposed next to the dermis and is called the stratum germinativum. The outermost stratum of the epidermis is called the stratum corneum, and is the skin "layer" or strata which is actually shed. The other layers remain on the snake.

A shed snake skin, the stratum corneum, may be mounted for display merely for its beautiful appearance as a decorative wall mounting. An even more important use for the shed snake skin, however, is for the advancement of the science of the study of snakes, known as herpetology. For such scientific study, the shed skins provide an ideal means of identification of the various species of snakes, as the majority of the identification characteristics needed to identify specimens are retained with the shed skins.

Moreover, the sloughed off keratinized skin allows the study of individual characteristics within a species. It is a "negative" which can be said to be the "finger prints" of the snake. According to my understanding, no two snakes, even of the same species and geographic range, have the same squamation. Each individual skin has characteristics to separate it from another, whether it be the scale counts, scale arrangement or pattern. All of the aforesaid characteristics are retained in the shed skin.

The actual colors of the individual snake are for the most part retained by the dermis layer of skin below the stratum germinativum. However, the pattern of the snake's color scheme is retained to a great degree in a shed skin which can be compared with the processed negative film, as opposed to the finished photograph. The shed skin does not produce the actual colors, but produces the color patterns of light and dark and shades and tones, much as black and white photography can be compared to color photography of the same object. Thereby color pattern, which is faithfully reproduced in the stratum corneum provides an excellent means of identification of species and study of the individual differences of particular snakes within the species.

Accordingly, it is desirable to utilize a method of mounting which will preserve all of the inherent identifying characteristics of the shed skin and provide an attractive and lasting display of the myriad characteristics of each specimen.

It should be noted, however, that the mounting of a shed snake skin presents quite different problems from the mounting of commercial "skins." The decorative snake skins which one may see in commercial use, such as snake skin jewelry, belts, shoes, purses or book binding, comprise the entire epidermis and dermis. They are obtained only by killing the snake. Because such skins or hides are comprised of the strong and thick epidermis and dermis combination, the treatment of such "commercial" skins is entirely different from the treatment which can be afforded to a shed skin which is only the thin stratum corneum and requires special treatment in mounting.

As stated by L. M. Klauber, volume one, second edition of "Rattlesnakes, Their Habits, Life Histories, and Influence on Mankind," at page 352:

> "Despite the fact that the skin is shed in a single piece, it is delicate and frangible, with little tensile strength. Such a shed skin should not be confused with durable and ornamental snake skins whose commercial uses are described elsewhere (p. 1057). These commercial skins include the entire epidermis and dermis as well; the snakes must be killed to secure them."

This delicateness presents a problem in removing foreign particles and wrinkles. The presence of foreign particles and wrinkles are usually an integral part of a shed snake skin. When a snake sheds its skin, the skin becomes inverted so that the inside becomes the outside. The inside of the skin is moist. Accordingly, this freshly shed skin will pick up and adhere to foreign particles with which it comes in contact. Moreover, due to the moisture at shedding, the shed skin has folded areas or creases where two damp sides have come into contact with each other.

Because the shed snake skin is so delicate and frangible, it is difficult to mount without tearing or unsightly bulges. The difficulty of mounting is enhanced by the problem of removing the wrinkles and foreign particles without tearing the skins. As a result, the shed skin cannot be treated as one would treat the hide of an animal, including the hide of a snake (i.e., the dermis and epidermis). For example, a process such as described in the Allen prior art U.S. Pat. No. 1,009,881 would not be applicable. Similarly, the use of chemicals, such as are used in tanning animal skins, including reptiles, is expensive and undesirable.

SUMMARY OF THE INVENTION

Where one begins with a wrinkled, creased stiff shed snake skin covered with foreign particles, the skin is soaked in a water bath until it is limber, saturated, and free of folds or creases. It is then washed in a smooth and steady flowing stream of water to remove any remaining foreign particles. Excess water is removed, with the skin remaining saturated, however. The skin is then placed on a puddle of water disposed on a flexible plastic material. The skin is then cut longitudinally and flattened on the puddle and caused to dry at room temperature. The resulting product is a dry, clean and free of folds snake skin which is adhered to the plastic substrata without the need for adhesives. The product is produced simply and effectively, without tears or rips and providing an attractive mounting which preserves the desired identifying characteristics, and is free of wrinkles and foreign particles.

DESCRIPTION OF THE PREFERRED EMBODIMENTS

A generally tubular shaped shed snake skin, the stratum corneum, is saturated in water to make it limber. It is then examined for folds. It is also checked for degree of saturation by testing it for limberness. The skin is reimmersed in water and then re-examined to see if any folds remain and to insure that the skin is sufficiently limber. The limber, saturated, and free of folds snake skin is then washed in a slow steady water stream to remove any remains of foreign particles. A light is shone from behind the skin to determine whether the foreign particles have been removed. If not, the skin is resubjected to the wash in water stream, with the process being repeated until the foreign particles are removed. Excess water is removed from the skin by a gentle rolling and absorption process. A flexible plastic material is spread on a hard surface and moistened to form a puddle or pool of water. The saturated shed skin is then placed on the puddle, cut longitudinally, and spread flat on the puddle, and caused to dry to form a unitary product.

Where one begins with a shed snake skin, that is wrinkled and contains foreign particles, the skin is first immersed in a bath of water. The temperature of the water can be around room temperature, for example 68° F. The skin remains immersed in the water until it is completely saturated. By such time, all of the creases will have been removed, and the skin becomes limber. The amount of time required will vary with conditions, including the condition of the skin at the time it is immersed in the water. For example, a freshly shed relatively straight skin will already contain a great deal of moisture and will not take as long to become limber and free of wrinkles. At the time that the skin is sufficiently saturated to remove the folds, it should also be pliable. If for any reason some of the skin was devoid of significant folds when the immersion began, but the skin is not pliable at the time the absence of folds was observed, the skin should remain in the water until the skin is readily manually pliable. For the skin to be sufficiently pliable, the area of skin between the scales should readily expand when pulled apart and contract when the strain has been released.

Because of the aforesaid variables for saturation to occur to the extent desired, it is necessary to periodically remove the skin from the water to inspect it for the absence of folds or creases and the presence of sufficient pliability. If folds or creases are present, or the skin is not sufficiently pliable, it should be reimmersed in the water with the inspection process and reimmersion continued until the desired pliability and freedom from folds is achieved.

Often, when the skin is free of folds, it is also free of foreign particles. The foreign particles will have separated as part of the soaking process. However, in order to be certain of the absence of foreign particles, the next procedure is to hold the skin between one self and a source of light. Since the skin is translucent, such an inspection will reveal any foreign particles which remain. It is desirable to remove the foreign particles so that they do not interfere with the mounting of the skin in accordance with the present process. Another objective, of course, is for accuracy and beauty of the mounting. When mounted against a light background, such as a white background, the foreign particles would stand out so as to interfere with or confuse the patterns of the snake which are characteristic of the particular snake, which are to be studied, and thus should be removed for a beautiful reproduction.

If the visual inspection reveals the presence of foreign particles, then such particles may be readily removed by subjecting the skin to a slow steady stream of water, such as from a tap. Again, a visual inspection in the presence of the light shining through the skin will reveal whether the washing by the flowing water has been sufficient to remove the foreign particles. If all of the foreign particles are not removed, then the washing and inspection cycles should be continued until all foreign particles are visually seen to be removed.

The next step is to prepare the backing or substrate material. The preferred mounting material is flexible plastic material to which the moisture saturated keratin surface of the skin will form a physical adhesion upon drying. A preferred material for this is a material manufactured by the H. P. Smith Company, 5001 West 66th Street, Chicago, Illinois, under the trademark SUPER LOXOL. Such material has a clear plastic coating of the type described. Laminated to the back of the plastic coating is a white paper-like material which provides a stark contrasting effect against the patterns of the snake skin, whereby the characteristics of the skin will be more readily indentifiable.

The mounting plastic should have some rigidity. Paper, such as SUPER LOXOL, which is often commonly referred to as a plastic coated white freezer wrap paper, has this quality. The size of the freezer wrap or SUPER LOXOL paper used should exceed the length and anticipated width of the shed skin.

The aforesaid freezer wrap or SUPER LOXOL paper should first be spread on a flat surface with the plastic coating facing upwards. For smaller snakes, a table will suffice. However, for larger snakes, the large open floor space must be utilized.

The plastic coating of the substrate of the SUPER LOXOL paper should then be liberally sprinkled with ordinary tap water. The water will be "pilled" or puddled on the plastic. The skin is laid down on this "pilled" or puddled water. In placing the skin on the "pilled" water, the inside of the skin should contact the water. Since the snake inverts the skin in the shedding process, the inside is already turned outside. Preferably, the skin in its generally tubular inverted form is placed on the puddle. The next step is to cut the skin, holding the head part of the skin with one hand and supporting the rest of the skin with the other hand, with the belly side facing up, and place the head in contact with the "pilled" water. Then complete the placement of the rest of the skin on the pilled water. With the back of the skin, in contact with the water proceed to lay open the skin. The skin is cut by a pair of scissors along an imaginary center line of the belly scales from the tip of the lip down to the end of the tail. The rostral scale on the tip of the upper snout should be cut on a perpendicular line from the lips so as to allow the head area of the snout to lay flat. The actual exterior of the skin is now visible or up, with the skin spread on the puddle of water on the mounting material.

At this point, the degree of saturation of the shed skin should again be checked by manipulating the skin to test it for elasticity. The area of skin between the scales should readily expand when pulled apart and contract when the strain is released.

If additional water is necessary to achieve saturation, water should be poured along the cut edge of the skin. The cut edge can be observed to be drawing the water in. Such addition of water should be continued until the aforesaid elastic condition is achieved.

Once it has been determined that the shed skin will hold no more water, the excess water should be gently rolled out from the skin with any suitable instrument such as a large dowel rod which is twelve inches long. First, a preliminary rolling operation is preformed to remove the excess water. One end of the roller is placed on the snout with the remainder of the roller lying along the middle of the back. The roller should be then gently rolled to one side with the excess water being soaked up with a towel as the water appears. Then the rollers should be placed back to the original position and rolled to the other side. This same procedure should be followed down to the end of the tail. Once the excess water has been removed, the skin should be manipulated to the desired final position.

Once the desired final position has been obtained, a thin cotton towel or any piece of thin absorbent material is placed over the skin. By the utilization of the same technique as before, slightly more pressure is applied to the roller to force out all the remaining moisture. The use of the towels in the final rolling where slightly more pressure is applied prevents damage to the skin and helps in removing the moisture.

Should the lips of the head area present the problem of failing to flair out, a few drops of water may be added along the lip area to cause them to float. The absorbent material should then be placed on the head with the roller placed as previously mentioned, quickly rolling from one side to the other. The water under these circumstances should force the lips to flair out flat as the water is forced out by the roller.

Any air bubbles which occur should be manipulated to the edge of the skin and expelled. The presence of an air bubble when the skin is mounted may distort the scales and pattern arrangement.

The mounting material and skin combination are then allowed to dry at room temperature. Depending on the humidity, this can take from about two to six days. At the end of such time, a unitary, mounted product is obtained without the use of adhesives. It is believed that the adherence between the shed skin and the plastic substrate is by the adherence of the actual skin portion between the scales to the substrate, at least to a greater degree than the scales adhere to the substrate, if at all. It is to be understood that the term "skin" as used herein refers to the actual skin material and scales, except where a specific distinction is indicated.

Occasionally one is fortunate in finding a dry shed skin which is free of wrinkles and foreign particles. Also, sometimes, one is not able to begin the mounting of the shed skin immediately upon completion of the aforesaid soaking saturation, and cleaning process. As a result, the shed skin may dry before the mounting begins. In either case, saturation of the dry skin can be made by spreading the dry skin on the mounting surface and applying tap water along the exposed side edge of the skin. The skin will draw the water in like a blotter. The application of the water is continued until saturation, as indicated by the aforementioned tests, occurs, and a film of water is dispersed between the shed skins and the substrate. The shed skin is then rolled to remove excess moisture and dried as previously described.

The mounted skin can be rolled into a scroll and stood upright in a non-compressed condition for storage, or the mounted shed skin can be hung on the wall. Due to the adverse effect of mold in time, the mounted skins should not be stacked. If stacking is desired, then the skin can be preserved such as by applying a coating of Mylar.

By the foregoing invention, an attractive, clean wrinkle-free mounting is efficiently and effectively provided for the display and study of shed snake skins.

I claim:

1. A method of mounting a shed snake skin comprising, the steps of:

causing a shed snake skin to be disposed on an adhesive free substrate with the skin being in a saturated condition, and with the interior of the shed snake skin being free of adhesive and facing the substrate with at least a film of adhesive free liquid disposed between the shed snake skin and the substrate, removing excess liquid by applying a rolling pressure to the exterior of the skin, and causing the shed snake skin to dry whereby at least portions of the skin and substrate adhere to each other to form a unitary product.

2. A method of accordance with claim 1, wherein, the film of liquid is placed on the substrate prior to disposing the interior of the shed snake skin on the substrate.

3. A method in accordance with claim 1 wherein, the shed snake skin is first disposed on the substrate, adhesive free liquid is then applied to the edges of the snake skin to saturate the shed snake skin and to provide the film of liquid between the interior of the shed snake skin and the substrate.

4. A method in accordance with claim 1, wherein the rolling pressure is accompanied by the application of an absorbent material to the exterior of the shed snake skin.

5. A method in accordance with claim 2, wherein the liquid is essentially water.

6. A method in accordance with claim 3 wherein the liquid is essentially water.

7. A method in accordance with claim 1 wherein the steps are performed in seriatim.

8. A method comprising essentially the steps of claim 1 as the sole means of securement of the shed snake skin to the substrate.

9. A method of mounting a shed snake skin comprising, the steps of:

causing a shed snake skin to be disposed on a plastic and adhesive free substrate with the skin being in a saturated condition, and with the interior of the shed snake skin being free of adhesive and facing the substrate with at least a film of adhesive free water disposed between the shed snake skin and the substrate, removing excess water by applying a rolling pressure to the exterior of the skin in a direction towards the side edges of the shed skin, and causing the shed snake skin to dry at room temperature whereby at least portions of the skin and substrate adhere to each other to form a unitary product.

10. A mounted shed snake skin, wherein the interior of a shed snake skin is disposed in contact with a substrate and wherein, said snake skin was mounted by the steps of:

causing a shed snake skin to be disposed on an adhesive free substrate with the skin being in a saturated condition and with the interior of the shed snake skin being free of adhesive and facing the substrate with at least a film of adhesive free liquid disposed between the shed snake skin and the substrate.

removing excess liquid by applying a rolling pressure to the exterior of the skin, and causing the shed snake skin to dry whereby at least portions of the skin and substrate adhere to each other to form a unitary product.

11. A mounted shed snake skin in accordance with claim 10, wherein the film of liquid is placed on the substrate prior to disposing the interior of the shed snake skin on the substrate.

12. A mounted shed snake skin in accordance with claim 10, wherein the shed snake skin is first disposed on the substrate, adhesive free liquid is then applied to the edges of the snake skin to saturate the shed snake skin and to provide the film of liquid between the interior of the shed snake skin and the substrate.

* * * * *